(12) United States Patent
Ishii et al.

(10) Patent No.: US 7,455,936 B2
(45) Date of Patent: *Nov. 25, 2008

(54) ELECTRIC CELL

(75) Inventors: Haruchika Ishii, Tokyo (JP); Norio Takami, Kanagawa-ken (JP); Tomokazu Morita, Chiba-ken (JP); Mitsuo Kasori, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 743 days.

This patent is subject to a terminal disclaimer.

(21) Appl. No.: 10/927,172

(22) Filed: Aug. 27, 2004

(65) Prior Publication Data

US 2005/0019672 A1 Jan. 27, 2005

Related U.S. Application Data

(63) Continuation of application No. 09/964,460, filed on Sep. 28, 2001, now Pat. No. 6,790,563.

(30) Foreign Application Priority Data

Sep. 29, 2000 (JP) ............................ 2000-300987
Sep. 29, 2000 (JP) ............................ 2000-300994

(51) Int. Cl.
*H01M 6/04* (2006.01)
*H01M 4/46* (2006.01)

(52) U.S. Cl. .................. 429/347; 429/199; 429/203; 429/204; 429/205; 429/207; 429/218.1

(58) Field of Classification Search ............... 429/347, 429/218.1, 199, 202–207
See application file for complete search history.

(56) References Cited

U.S. PATENT DOCUMENTS

| 2,554,447 | A | 5/1951 | Sargent |
| 2,638,489 | A | 5/1953 | Ruben |
| 2,838,591 | A | 6/1958 | Stokes |
| 4,882,244 | A | 11/1989 | Donahue et al. |
| 6,589,692 | B2 | 7/2003 | Takami |

FOREIGN PATENT DOCUMENTS

JP   2000-3713   1/2000

*Primary Examiner*—Tracy Dove
(74) *Attorney, Agent, or Firm*—Oblon, Spivak, McClelland, Maier & Neustadt, P.C.

(57) ABSTRACT

An electric cell comprising a positive electrode, a negative electrode containing aluminum or aluminum alloy, and an electrolyte arranged between the positive electrode and the negative electrode, wherein the electrolyte includes: at least one ion selected from a group of a sulfate ion ($SO_4^{2-}$) and a nitrate ion ($NO_3^-$), the concentration of the ion being in the range of 0.2 to 16 M/L; and an additive selected from a group of an organic acid, a salt of the organic acid, a hydrate of the organic acid, an ester of the organic acid, an ion of the organic acid, and derivatives thereof.

6 Claims, 1 Drawing Sheet

ELECTRIC CELL

CROSS-REFERENCE TO RELATED APPLICATIONS

This application is based upon and claims the benefits of priority from the prior Japanese Patent Application Nos. 2000-300987 and 2000-300994 filed on Sep. 29, 2000; the entire contents of which are incorporated herein by reference.

FIELD OF THE INVENTION

The present invention relates to an electric cell using a negative electrode of aluminum.

BACKGROUND OF THE INVENTION

Currently, manganese cells, alkaline cells, and so on have been used as electric power sources of a wide variety of portable electric devices such as handheld personal computers, personal digital assistants (PDAs), and cellular phones. Typically, each of these cells comprises: a negative electrode made of zinc; and a positive electrode made of manganese, with an electromotive force of 1.5 volts. As the portable electric devices became more advanced, the improvements in high voltage, high capacity, and lightweight characteristics of primary or secondary cells have been demanded.

In contrast, it has been expected that the improvements in high voltage, high capacity, and lightweight characteristics of such primary cells would be easily attained, compared with those of the primary cells using the negative electrodes made of zinc. Thus, the primary cells using negative electrodes made of aluminum have been investigated and developed for a long time. Among the prior art technologies, for example, U.S. Pat. No. 2,838,591 (1958) discloses a primary cell comprising a positive electrode containing manganese dioxide, a negative electrode made of aluminum, and an electrolyte consisting of a weak-acid aqueous solution of aluminum chloride. In this case, however, the aluminum employed in the negative electrode tends to react with the electrolyte, so that there are several problems of generating a gas as a reaction product and increasing the amount of self-discharge. Moreover, it is demanded that a primary cell of a high output by which a larger amount of current can be obtained as compared with that of using a weak-acid aqueous solution of aluminum chloride as an electrolyte.

BRIEF SUMMARY OF THE INVENTION

To overcome the limitations in the prior art described above and other limitations that will become apparent upon reading and understanding the present specification, it is an object of the present invention is to provide an electric cell using aluminum or aluminum alloy in a negative electrode.

In the first aspect of the present invention, an electric cell using aluminum in a negative electrode comprises a positive electrode, the negative electrode containing aluminum or aluminum alloy, and an electrolyte arranged between the positive electrode and the negative electrode, wherein the electrolyte includes: at least one ion selected from a group of a sulfate ion ($SO_4^{2-}$) and a nitrate ion ($NO_3^-$); and an additive selected from a group of an organic acid, a salt of the organic acid, an hydrate of the organic acid, an ester of the organic acid, an ion of the organic acid, and derivatives thereof.

In a second aspect of the present invention, an electric cell using aluminum in a negative electrode comprises a positive electrode, the negative electrode containing aluminum or aluminum alloy, and an electrolyte arranged between the positive electrode and the negative electrode, wherein the electrolyte comprises at least one ion selected from a group of a sulfate ion ($SO_4^{2-}$) and a nitrate ion ($NO_3^-$); and a surface of the negative electrode is contacted with one selected from an organic acid, a salt of the organic acid, an hydrate of the organic acid, an ester of the organic acid, an ion of the organic acid, and derivatives thereof.

Here, the additive or a material to be contacted with the surface of the negative electrode can be at least one functional group selected from a carboxylic group (COOH), a sulfonic group ($SO_3H$), a hydroxyl group (OH), and a nitro group ($NO_2$); and a derivative thereof.

The additive or a material existing on the surface can be a polymeric compound and a derivative thereof.

The electrolyte may contain a halogen ion.

In a third aspect of the present invention, an electric cell using aluminum in a negative electrode comprises a positive electrode, the negative electrode containing aluminum or aluminum alloy, and an electrolyte arranged between the positive electrode and the negative electrode, wherein the electrolyte includes at least one ion selected from a group of a sulfate ion ($SO_4^{2-}$) and a nitrate ion ($NO_3^-$); and the surface of the negative electrode includes an oxide layer containing at least one element selected from a group of chromium, sulfur, nitrogen, boron, carbon, and phosphorus.

Here, the negative electrode may include the oxide layer containing: at least one of organic acid selected from a group of sulfuric acid, nitric acid, oxalic acid, chromic acid, boric acid, phosphoric acid, carbonic acid, sulfosalicylic acid, maleic acid, acetic acid, and carboxylic acid; an ion of the organic acid; a salt of the organic acid; or derivatives thereof.

In a fourth aspect of the present invention, a cell using aluminum in its negative electrode comprises a positive electrode, a negative electrode containing aluminum or aluminum alloy, and an electrolyte arranged between the positive electrode and the negative electrode, wherein the electrolyte includes: at least one ion selected from a group of a sulfate ion ($SO_4^{2-}$) and a nitrate ion ($NO_3^-$); and an additive, where the additive includes one of: a heterocyclic organic compound containing nitrogen; and a nitrogen-containing organic compound containing at least one functional group selected from a group of an amino group, an imino group, an azi group, and an azide group, an ion of the nitrogen-containing organic compound, a salt of the nitrogen-containing organic compound, or a derivative of the nitrogen-containing organic compound.

Here, the negative electrode may be comprised of an alloy of aluminum with at least one metal selected from Mn, Cr, Sn, Ca, Mg, Pb, Si, In, and Zn.

The thickness of the oxide layer may be from 0.1 nm to 1,000,000 nm, preferably from 5 nm to 50,000 nm.

The amount of the organic acid to be introduced into the oxide layer may satisfy $10^{-11} \leq y \leq 0.1$, preferably $10^{-7} \leq y \leq 0.1$ when the composition of an oxide coating film is defined as $Al_2O_3+zXy$ where X denotes Cr, S, N, B, C, or B, and Z is a given number.

The additive may be at least one selected from a group of: methyl alcohol, ethyl alcohol, propyl alcohol, butyl alcohol, phenol, glycerol, glycolic acid, ethylene glycol, formic acid, acetic acid, propionic acid, oxalic acid, salicylic acid, sulfosalicylic acid, malic acid, tartalic acid, succinic acid, fumaric acid, phtalic acid, malonic acid, citric acid, maleic acid, lactic acid, butyric acid, pyruvic acid, benzoic acid, sulfobenzonic acid, nitromethane, sulofoaniline, sulfonyl nitorobenzene, polyvinyl alcohol, vinyl acetate, vinyl sulfonate, poly(sulfonate vinylbenzene), poly(vinyl acetate), methyl acetate, acetic anhydride, maleic anhydride, phthalic anhydride, diethyl malonate, sodium benzoate, sodium sulfobenzoate, sulfoaniline chloride, chlorethyl acetate, dichlormethyl acetate, poly(vinyl acetate potassium salt), poly(styrene lithium sulfonate), polyacrylate, and lithium polyacrylate.

The concentration of the additive in the electrolyte may be from 0.0001 to 40% by weight, preferably from 0.0001 to 30% by weight.

The above and other objects, effects, features, and advantages of the present invention will become more apparent from the following description of embodiments thereof taken in conjunction with the accompanying drawings.

DETAILED DESCRIPTION OF THE INVENTION

Figure 1:
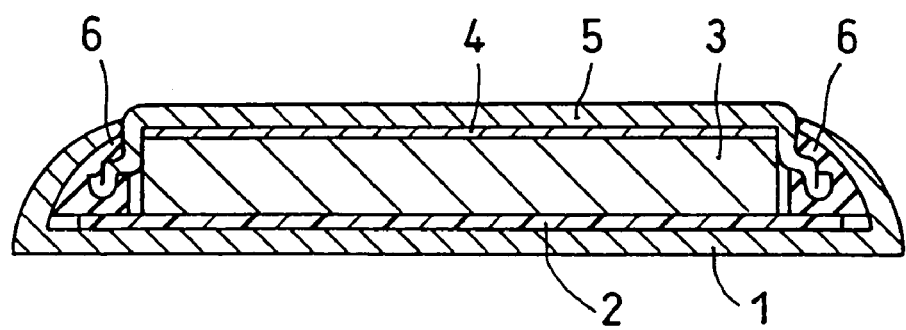
FIG. 1 is a cross sectional view of a coin-shaped electric cell as embodiments of the present invention.

An embodiment of the invention will be explained according to FIG. 1. As shown in the figure, a cell is formed as a closed container by fixing a sealing plate 5 on a negative electrode container 1 through an insulating gasket under an electrically insulating condition. The negative electrode container 1 serving as a cell container and a negative electrode is in the shape of a closed-end cylinder and is made of aluminum or aluminum alloy. The sealing plate 5 serving as a positive electrode terminal is in the shape of a closed-end cylinder and is made of a metal such as molybdenum, tungsten, lead, or titanium nitride.

In addition, a separator 2 of an insulating porous body is arranged on an inner bottom portion of the negative electrode container 1. A positive electrode mixture 3 containing manganese dioxide as a positive electrode activator and a positive electrode current collector 4 of a conductive material such as tungsten are stacked on the separator 2 in order. By the way, the current collector 4 is contacted with the sealing plate 5, so that an electric conductivity between the positive electrode mixture 3 and the sealing plate 5 can be conferred.

Furthermore, the closed container is filled with an electrolyte. The electrolyte can be retained in, for example pores of the separator and the positive electrode mixture between the positive electrode and the negative electrode. Therefore, it is constructed so that the electrolyte can be sandwiched between the positive electrode and the negative electrode container 1.

The electrolyte used in the embodiment may be an aqueous solution containing a sulfate ion or an aqueous solution containing a nitrate ion. In other words, the electrolyte contains a sulfate ion($SO_4^{2-}$) or a nitrate ion($NO_3^-$) is contained in the electrolyte.

Furthermore, the electrolyte may contain an additive such as an organic acid, a salt, ester, anhydride, or ion thereof, or a derivative thereof. Alternatively or in addition to the additive, a nitrogen-containing organic compound may be contained in the electrolyte.

In the electric cell as constructed above, for example, reactions represented by the following formulas (1) and (2) are performed on the positive and negative electrodes, respectively. Especially, the reaction using a high reactive ion such as a nitrate ion or a sulfate ion allows a high output of the electric cell.

Positive electrode: $MnO_2 + H^+ + e^- \rightarrow MnOOH$ (1)

Negative electrode: $Al \rightarrow Al_3 + 3e^-$ (2)

Aside from the cell reaction, there is a tendency to corrode the aluminum of the negative electrode (i.e., to cause a self-discharge) by a corrosion reaction of the following formula (3) when a sulfate aqueous solution is used as the electrolyte. As described above, as the nitrate and sulfate ions have high reactivities, the corrosive properties of the ion are high in spite of generating a high output from the cell.

$2Al + 3H_2SO_4 \rightarrow Al_2(SO_4)_3 + H_2 \uparrow$ (3)

In the electric cell of the embodiment using aluminum in an negative electrode, the addition of the above additives such as the organic acid in the electrolyte allows the restriction on the corrosion reaction (3) with little loss of the reactions (1) and (2).

Figure 2:
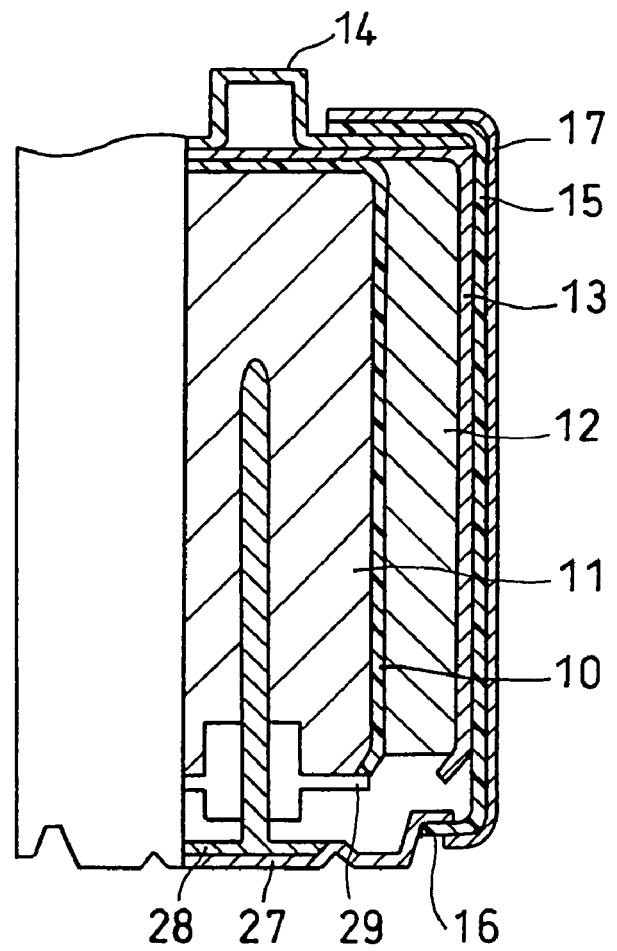
FIG. 2 is a cross sectional view of a cylindrical-shaped electric cell as embodiments of the present invention.

The electric cell structure to be applied in the invention is not limited to a coin shape. Various modified shapes may be allowable in the invention. As shown in FIG. 2, for example, the electric cell may be configured in the shape of a cylinder. Hereinafter, we will describe the configuration of the electric cell with reference to FIG. 2.

In FIG. 2, a rod-shaped negative current collector body 28 is welded on a negative terminal plate 27. A negative electrode sealing plate 29 is fixed on the lower part of the current collector 28 by insertion. A separator 10 in a closed-cylinder shape is arranged so as to enclose a negative electrode gel 11 comprised of aluminum particles and polymer.

The negative gel 11 fills the space defined by the separator 10 and the sealing plate 29. A positive electrode mixture 12 in a cylindrical shape is arranged on the peripheral surface of the separator 10. The top surface of the separator 10 and the top and peripheral surfaces of the positive electrode mixture 12A are covered with a positive electrode current collector 13 in a closed-cylindrical shape covers.

The negative electrode gel 11, the separator 10, and the positive electrode mixture 12 are impregnated with the electrolyte. A positive electrode terminal 14 in a hat shape is arranged on the top surface of the positive electrode current collector 13. An outer casing 15 in a cylindrical shape has upper and lower ends inwardly bent to form upper and lower bent portions, respectively. Also the outer casing 15 covers the peripheral surface of the positive current collector 13. The inner surface of the upper bent portion is adhered on the peripheral surface of the positive electrode terminal 14 with an adhesive insulating material such as a tar or a pitch. On the other hand, the lower bent portion is adhered on the peripheral edge of the negative electrode terminal plate 27 with an adhesive insulating material 16 such as a tar or a pitch. At least the inner surface of the outer casing 15 is made of a resin. For example, the outer casing 15 is coated with the outer case tube 17 made of a metal thin leaf.

Now, the electric cell of the invention will be described in the follows for every component thereof.

(a) Positive Electrode

The positive electrode comprises: a positive mixture 3 including a positive electrode active material, a conductive agent, and so on, and optionally a binder; and a current collector 4 on which the positive mixture 3 is formed.

The positive active material may be a metal oxide, a metal sulfide, a conductive polymer, and so on. The metal oxide may be manganese dioxide ($MnO_2$), or alternatively it may be selected from lead dioxide ($PbO_2$), nickel hydroxide (NiOOH or $Ni(OH)_2$), silver oxide ($Ag_2O$), iron oxide, and so on. The iron oxide may be FeO, $FeO_2$, $FeO_X$ (wherein X>1.5), $M_xFeO_4$ (wherein M represents one selected from Li, K, Sr, and Ba, and $X \geq 1$), or the like.

The metal sulfide may be iron sulfide (FeS), nickel sulfide (NiS) and so on.

The conductive polymer may be polyaniline, polypyrrole, an organic sulfur compound such as a disulfide compound or a sulfur compound, or the like. Among them, manganese dioxide is preferable.

The conductive agent may be graphite, acetylene black, carbon black, or the like.

Depending on the amount of a given conductive agent in the positive electrode mixture, an electronic conductivity between the positive electrode mixture and the current collector can be increased. Preferably, the amount of the conductive agent is of 1 to 20% by weight on the basis of the mixture. In other words, if it is less than 1% by weight on the basis of the mixture, the electronic conductivity in the positive electrode mixture cannot be increased to a sufficient degree. If it is greater than 20% by weight on the basis of the mixture, the amount of the positive electrode active material in the mixture can be decreased to raise the possibility of preventing the sufficient positive electrode reaction.

The positive electrode mixture 3 may be also prepared by blending a powdery positive electrode active material with a powdery conductive agent and then pressure-molding the blended materials into a pellet. In addition, the binder may be additionally blended in the positive electrode mixture as needed to fix the positive electrode active material on the surface of the current collector.

The binder to be contained in the positive electrode mixture may be polytetrafluorethylene or the like.

The positive electrode current collector 4 supporting the positive electrode mixture is provided for improving the electronic conductivity between the positive electrode mixture and the positive electrode terminal.

The positive electrode current collector can be prepared as a porous body or a non-porous body. A material adaptable for use as the positive electrode current collector 4 may be at least one selected from tungsten (W), molybdenum (Mo), lead (Pb), and titanium nitride (TiN), or preferably may be one containing a conductive material such as a carbonaceous material. Each of tungsten (W), molybdenum (Mo), and lead (Pb) may exist singly in the positive electrode current collector. Alternatively, two ore more elements selected from tungsten (W), molybdenum (Mo), and lead (Pb) may exist in combination as an alloy. On the other hand, the TiN-containing positive electrode current collector may be provided as one made of titanium nitride, or it may be provided as a metal plate such as a nickel plate having a surface coated or plated with titanium nitride. Among them, the metal selected from the group of tungsten (W) and molybdenum (Mo) or a carbonaceous material is preferably contained as a conductive material in the positive electrode current collector.

The content of the conductive material comprised of one ore more selected from tungsten (W), molybdenum (Mo), lead (Pb), and titanium nitride is preferably 99% or more by weight on the basis of the positive electrode current collector, more preferably 99.9% or more.

The positive electrode current collector using the carbonaceous material as the conductive agent may be prepared by blending the powdery carbonaceous material with the binder followed by pressure-molding. The powdery carbonaceous material may be a graphite power or a carbon fiber. The content of the carbonaceous material is preferably 80% or more by weight on the basis of the positive electrode current collector, more preferably 90% or more by weight. This positive electrode current collector may be also mixed with the electrolyte described below in advance. Furthermore, the positive electrode current collector using the carbonaceous material can be also prepared as a porous body or a non-porous body as needed.

(b) Negative Electrode

The negative electrode 1 is made of aluminum or aluminum alloy. If aluminum is used as the negative electrode 1, the purity of aluminum is preferably 99.5% or more by weight. In other words, it is preferable that the content impurities such as Fe and Cu, by which a self-discharge can be easily initiated, is 0.5% or less by weight on the basis of the aluminum. If the content of impurities exceeds 0.5% by weight, the negative electrode becomes more susceptible to the corrosive effect of the electrolyte, threatening to cause the self-discharge heavily or to generate a gas. More preferable purity of aluminum is 99.9% or more by weight.

Specifically, aluminum alloy to be used in the negative electrode may be made of a combination of Al with at least one metal difficult to cause the self-discharge. Such a metal may be selected from Mn, Cr, Sn, Ca, Mg, Pb, Si, In, and Zn. Among them, Mg and Cr are preferably selected and combined with Al to make a preferable aluminum alloy. The composition of the aluminum alloy may be 94.5 wt % Al-2 wt % Mg-3.5 wt % Cr, 95% Al-5 wt % Mg, 99.5% Al-0.3 wt % Mn-0.2 wt % Zn, or the like.

The negative electrode having the structure shown in FIG. 2 may be prepared by mixing aluminum or aluminum alloy with the electrolyte described below in advance. In addition, the surface of the negative electrode may be coated with a coating material. The coating material may be an organic acid, a salt of the organic acid, an anhydride of the organic acid, an ester of the organic acid, an ion of the organic acid, or one selected from compounds or high molecular compounds having at least one functional group selected from a carboxylic group (COOH), a sulfonic group ($SO_3H$), a hydroxyl group (OH), a nitro group ($NO_2$), and derivative thereof, which will be described in the subsequent paragraph of additives.

Any material made of the additive contained in the surface of aluminum or aluminum alloy has the same effect of preventing the corrosive reaction just as in the case with the oxide described below. Such a material will be described in the paragraph (d-2) of the additives.

Furthermore, an oxide layer can be formed as a coating film on the negative electrode. That is, the coating film is made of an acid or the like (including ion, salt, or derivative) containing Cr, S, N, B, C, or P in the inside of the oxide layer or in the surface of the oxide layer. The coating film is applied on the surface of aluminum or aluminum alloy to prevent the corrosive reaction between the electrolyte such as $H_2SO_3$ and the negative electrode such as aluminum.

The corrosive reaction represented by the formula (3) can be also caused by the following formulas (4) and (5) with respect to sulfuric acid and aluminum, respectively. In this case, it seems that the corrosive reaction on the negative electrode will be prevented. That is, the electronic conductivity of the above coating film formed on the surface of the negative electrode is low, so that electrons can be less smoothly transferred from the sulfuric acid and the aluminum when the electric cell is in a rest state.

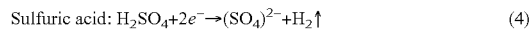
(4)

(5)

The oxide layer on the surface of the negative film is formed by an acid treatment of the aluminum surface at the time of manufacturing the negative electrode. Specifically, the acid to be used in the acid treatment may be sulfuric acid, nitric acid, oxalic acid, chromic acid, boric acid, phosphoric acid, carbonic acid, sulfosalicylic acid, maleic acid, acetic acid, carboxylic acid, or the like. These acids contain an element such as Cr, so that such an element can be incorporated as an acid or an ion into the oxide layer.

In the acid treatment on the negative electrode, furthermore, the oxide layer can be formed by dipping the aluminum or the aluminum into a solution prepared by dissolving the above acid or the like in an appropriate solvent. During the acid treatment, the organic acid, or an ion, salt, or derivative thereof is incorporated into the oxide layer. The duration of dip-coating and the acidity in the solution may be varied depending on the desired thickness of the oxide layer, the concentration of the above organic acid or the like to be doped, and so on.

The solution may be prepared as an acidic solution containing about 0.000001 M/L to 30 M/L, preferably 0.01M to 5 M/L of the above acid.

In case of necessity, an anodic oxidation may be performed under the condition of dipping the aluminum or the aluminum alloy as described above to form an oxide coating film containing the organic acid or the like.

The thickness of the oxide coating film is in the range of 0.1 nm to 1,000,000 nm, preferably in the range of 5 nm to 50,000 nm. If it is less than 0.1 nm, it becomes difficult to sufficiently protect the negative electrode from corrosion damage. If it is more than 1,000,000 nm, on the other hand, there is a possibility of preventing the electrode reaction.

In this manner, it is preferable to introduce the organic acid or the like into the oxide coating film so that the amount of the organic acid or the like will satisfy $10^{-11} \leq y \leq 0.1$ or $10^{-7} \leq y \leq 0.1$ when the composition of the oxide layer is represented by $Al_2O_3+zXy$ (wherein X is Cr, S, N, B, C, or P, and Z is a given value).

(c) Separator

The separator is made of an insulating material for preventing the electron transfer between the positive electrode and the negative electrode. In general, however, the separator may be of a porous body because of the necessity for keeping the electrolyte in the separator and for allowing the movement of an ionized electrolyte through the electrolyte. The material to be used as the separator may be Kraft paper, synthetic fabric sheet, natural fabric sheet, non woven fabric, glass fiber sheet, polyolefine porous film, or the like.

Preferably, the thickness of the separator is in the range of 10 μm to 200 μm. If it is thinner than 10 μm, there is a possibility of causing a short circuit between the positive electrode and the negative electrode. If it is thicker than 200 μm, especially 1,000 μm, on the other hand, the moving distance of the ionized electrolyte is increased, resulting in the decrease in the electrolytic conductivity.

Furthermore, there is no need to provide any separator between the positive electrode and the negative electrode if the configuration of the electric cell is able to retain the electrolyte between the positive electrode and the negative electrode in addition to arrange the positive electrode and the negative electrode without contact to each other.

The electrolyte may be used as the so-called solid electrolyte by forming a gel with a thickening agent. In this case, a thickening agent phase formed in the electrolyte is able to act as a separator, so that an electrolyte phase will be retained in the thickening agent phase.

(d) Electrolyte

The electrolyte to be used in the invention comprises an electrolyte, a solvent to dissolve the electrolyte, and an additive for preventing the corrosive reaction between the electrolyte and the negative electrode. In this configuration, a separator may be optionally provided between the negative electrode and the positive electrode. If the negative electrode is made of an oxide material, the electrolyte can be prepared using the electrolyte and the solvent for dissolving the electrolyte.

(d-1) Electrolyte

The electrolyte to be used in the invention is any electrolyte that allows the supply of at least one ion species selected from a sulfate ion ($SO_4^{2-}$) and a nitrate ion ($NO_3^-$). Therefore, the supply of high reactive ion such as $SO_4^{2-}$ and $NO_3^-$ allows the high output power of the electric cell.

The electrolyte in the type of supplying a sulfate ion ($SO_4^{2-}$) may be a sulfuric acid, aluminum sulfate, sodium sulfate, lithium sulfate, or the like.

The electrolyte in the type of supplying a nitrate ion ($NO_3^-$) may be a nitric acid, aluminum nitrate, sodium nitrate, ammonium nitrate, lithium nitrate, or the like.

It is preferable to adjust the amount of the electrolyte in the electrolyte so that the concentration of nitrate ion or sulfate ion is in the range of 0.2 to 16 M/L because of the following reason. That is, if the concentration of nitrate ion or sulfate ion is less than 0.2 M/L, the ionic conductivity becomes decrease. Thus, the formation of a coating on the surface of the positive electrode described below becomes insufficient, preventing the possibility of sufficiently protecting the negative electrode from the corrosive reaction. If the concentration of the nitrate ion or the sulfate ion is over 16 M/L, the formation of the coating the surface of the negative electrode becomes increased, so that it may become difficult to obtain the supply of high voltage. Therefore, the concentration of nitrate ion or sulfate ion is preferably in the range of 0.5 to 10 M/L.

In the electrolyte described above, the solvent for dissolving the electrolyte may be water, methyl alcohol, carbonate, or the like.

(d-2) Additive

The additive may be at least one species selected from the group of an organic acid, and a salt, ester, anhydride, and ion thereof.

It is considered that the additive prevents the corrosive reaction between the electrolyte such as $H_2SO_4$ and the negative electrode such as aluminum or aluminum alloy, by the existence of the additive on the surface of the negative electrode by means of a functional group of the additive. In the additives, there is one adsorbing on the negative electrode, or there is another one forming a coating on negative electrode. Furthermore, there is one forming a specific layer. In addition, there is one located at a position near the negative electrode. They are able to exert their performances under their respective condition.

In other words, it is considered that the corrosive reaction on the negative plate can be prevented. That is, the coating film as an additive component on the negative electrode surface is difficult to smoothly transport electrons between the nitric acid and the aluminum because of the decrease in the electronic conductivity.

Specifically, the additive contained in the electrolyte may be one selected from the group of: an acid (an organic acid) having at least one functional group of a carboxylic acid (COOH), a sulfonic acid ($SO_3H$), a hydroxyl group (OH), and a nitro group ($NO_2$); a salt, hydride, ester, and ion thereof, and derivatives thereof. More specifically, the additives include: methyl alcohol, ethyl alcohol, propyl alcohol, butyl alcohol, phenol, glycerol, glycolic acid, ethylene glycol, formic acid, acetic acid, propionic acid, oxalic acid, salicylic acid, sulfosalicylic acid, malic acid, tartalic acid, succinic acid, fumaric acid, phtalic acid, malonic acid, citric acid, maleic acid, lactic acid, butyric acid, pyruvic acid, benzoic acid, sulfobenzonic acid, nitromethane, sulofoaniline, sulfonyl nitrobenzene, polyvinyl alcohol, vinyl acetate, vinyl sulfonate, poly(sulfonate vinylbenzene), poly(vinyl acetate), methyl acetate, acetic anhydride, maleic anhydride, phthalic anhydride, diethyl malonate, sodium benzoate, sodium sulfobenzoate, sulfoaniline chloride, chlorethyl acetate, dichlormethyl acetate, poly(vinyl acetate potassium salt), poly(styrene lithium sulfonate), polyacrylate, lithium polyacrylate, and so on. Furthermore, the polymer may be a copolymer that includes one of them.

Therefore, it is possible to prevent the corrosion of the negative electrode as the protective film made of the above organic acid or the like is formed on the surface of the negative electrode.

The concentration of the additive in the electrolyte is preferably in the range of 0.0001 to 40% by weight on the basis of the electrolyte because of the following reasons. That is, if the concentration of the additive is less than 0.0001% by weight on the basis of the electrolyte, the sufficient effects of the additive on the surface of the negative electrode cannot be obtained so that there is a possibility of preventing the sufficient inhibition of the corrosive reaction. If it is greater than 40% by weight on the basis of the electrolyte, the ionic conductivity of the electrolyte/electrolyte decreases and thus it is not likely to be able to obtain the supply of high voltage any more. Therefore, more preferably, the concentration of the additive is in the range of 0.001 to 30% by weight on the basis of the electrolyte.

Adjusting the concentration of the additive within that range allows that the amount of the additive existing on the surface of the electrode is preferably kept in the range of about $1.0 \times 10^{-20}$ g/cm$^2$ to 1.0 g/cm$^2$. If it is less than $1.0 \times 10^{-20}$ g/cm$^2$, it becomes difficult to sufficiently prevent the corrosion of the negative electrode. If it is greater than 1.0 g/cm$^2$, there is a possibility of decreasing the ionic conductivity.

The amount of the additive to be required for making a coating can be measured by an electrochemical quartz-resonator microbalance method. Alternatively, the effects of the present invention can be fully exerted if the amount of the additive is enough to detect the presence of the additive by means of any spectroscopic measurement such as an infrared spectrophotometry or a nuclear magnetic resonance spectroscopy.

The electrolyte may further comprise one or more additional components. Preferably, the addition components include halogen ions of fluorides such as hydrofluoric acid, sodium fluoride, and ammonium fluoride; chlorides such as hydrochloric acid, aluminum chloride, lithium chloride, calcium chloride, and chromium chloride; bromides such as ammonium bromide, zinc bromide, and potassium bromate; and iodides such as ammonium include ammonium iodide and sodium iodide. Therefore, containing the halogen ion allows the increase in the amount of the additive being dissolved in the electrolyte. It becomes possible to improve the voltage of the electric cell.

The concentration of the halogen ion in the electrolyte is preferably in the range of 0.01 to 6 M/L. If it is less than 0.01 M/L, the effects to be obtained by containing the halogen cannot be attained sufficiently. On the other hand, if it is greater than 6 M/L, there is a possibility of increasing the self-discharge because of the corrosion of the negative electrode. Therefore, more preferably, the concentration of the halogen ion in the electrolyte is in the range of 0.05 to 4 M/L.

Alternatively, a nitrogen-contained heterocyclic organic compound; a nitrogen-contained organic compound having a functional group such as an amino group (—NH$_2$), an imino group (—NH), an azi group (—N=N—), or an azide group (—N$_3$); a salt, ester, an ion, or derivative thereof; or the like may be added as another embodiment of the additive into the electrolyte.

Specifically, the nitrogen-contained organic compound include pyridine, pyrazon, triazine, quinoline, acridine, acridone, aniline, dipyridyl, pyrrolidine, pyrazole, imidazole, thoriasole, diphenylamine, azobenzene, quinaldine, quinine, amino quinoline, aminobenzoic acid imidazole, oxyindole, benzothiazole, benzotriazole, oxyquinoline, acetamide, 1,10-phenanthroline, 1,10-phenanthroline chrolide, bathophenanthroline, succinimide, aminobenzoic acid, maleic acid imide, 2-mercapto-5-methylbenzimidazole, and so on.

The nitrogen-contained organic compound forms a protective film on the negative electrode by being adsorbed on the aluminum or the aluminum alloy through nitrogen ions. The electronic conductivity of the protective film is comparatively small, so that for example the electron transfer between the sulfuric acid and the aluminum shown in the formulas (4) (5) can be prevented. Thereby, it is considered that the corrosive reaction on the negative electrode may be prevented.

In addition, the concentration of the additive may be preferably adjusted so that the component of the coating film made of the additive being contacted on the surface of the electrode is kept in the range of $1.0 \times 10^{-20}$ g/cm$^2$ to 1.0 g/cm$^2$ because of the reasons described above.

Consequently, the electric cell using aluminum in a negative electrode allows a primary cell retarding self-discharge and gas generation.

EXAMPLES

Hereinafter, explanations of examples of the present invention in detail are made.

Example (1-1)

At first, an aqueous solution containing 1 M/L of sulfuric acid and 30% by weight of acetic anhydride (CH$_3$COOH) was prepared as an electrolyte.

Corrosion Test

A rounded aluminum rod (99.99% in purity, 1.00 g in weight, 1 mm in diameter) was dipped into the obtained electrolyte. Then, the amount of the additive coated on the surface of the aluminum rod was measured using Electrochemical Microbalance (EQCM), followed by dipping the aluminum rod furthermore for three straight days. Gas generated during the immersion was gathered and the yield of gas was measured to estimate the corrosion of aluminum. The results are shown in Table 1.

Electric Cell Test

As shown in FIG. 1, a coin-shaped electric cell using aluminum in a negative electrode was fabricated as follows.

At the beginning, a positive electrode mixture was prepared by blending a predetermined amount of manganese dioxide (MnO$_2$) as a positive electrode active material with 7.5% by weight of acetylene black and 5.0% by weight of polytetrafluorethylene and subjecting the obtained blend to the press molding.

A glass fiber sheet of 30 μm in thickness provided as a separator was held in a negative electrode container made of aluminum (99.9% in purity) in a closed-cylindrical shape. Then, the positive electrode mixture obtained by the above step was placed on a separator. Subsequently, the same electrolyte as one used in the corrosion test was injected into the container. After the injection, a closed-cylindrical-shaped sealing plate made of a metal was fixed on the container by swaging them together through an insulating gasket, resulting in a coin-shaped electric cell of 20 mm in diameter and 1.6 mm in thickness.

The electromotive force of the resulting cell was measured. Also, the cell capacity at the time of completing the discharge until the voltage fells to 0.65 V at a current of 1 mA was measured.

Examples (1-2) to (1 to 45), Comparative Examples (1-1) to (1-3)

The corrosion test was performed by the same way as that of Example (1-1) using the same materials of the electrolyte as listed in Table 1.

Also, each of the cells of Examples (1-2) to (1 to 45) and Comparative Examples (1-1) to (1-3) was fabricated by the same way as that of Example 1 except that the materials for preparing the positive electrode, the negative electrode, and the electrolyte were those of Table 1, respectively. The electromotive force of the cell and the cell capacity were measured by the same ways as those of Example 1.

The results are listed in Tables 1 to 3.

In the corrosion test, by the way, the yield of gas wad defined as 100 in the example (1-1), so that the results were represented by g the relative proportion to the example (1-1).

TABLE 1

| | Negative electrode (wt %) | | Electrolyte | | | | | |
|---|---|---|---|---|---|---|---|---|
| | | | Electrolyte (M/L) | | Solvent | Additional Component (wt %) | | Others (wt %) | |
| Example 1-1 | Al | 99.99% | Sulfuric acid | 1 | Water | CH$_3$COOH | 30 | — | |
| Example 1-2 | Al Mg Cr | 94.5% 2 3.5 | Nitric acid | 10 | Water | Ethyl alcohol | 20 | — | |
| Example 1-3 | Al | 99.99% | Aluminum sulfate | 5 | Water | Sulfobenzoic acid | 1 | — | |
| Example 1-4 | Al | 99.99% | Ammonium nitrate | 10 | Water | Polyvinyl alcohol | 0.01 | — | |
| Example 1-5 | Al | 99.99% | Aluminum nitrate | 2.5 | | Sulfoanilinechlorid | 5 | — | |
| Example 1-6 | Al | 99.99% | Ammonium sulfate | 2 | Water | Methyldichloracetate | 0.1 | Aluminum chloride | 0.5 |
| Example 1-7 | Al | 99.99% | Lithium sulfate | 1.5 | Water | Phthalic anhydride | 1.5 | Lithium chloride | 0.5 |
| Example 1-8 | Al | 99.99% | Sulfuric acid | 0.2 | Water | Methyl alcohol | 3 | Potassium chloride Sodium chloride Potassium nitrate | 0.25 0.25 0.25 |
| Example 1-9 | Al | 99.99% | Nitric acid | 2.5 | Water | Propyl alcohol | 0.01 | — | |
| Example 1-10 | Al | 99.99% | Sulfuric acid | 3 | Water | Buthyl alcohol | 0.1 | — | |
| Example 1-11 | Al | 99.99% | Nitric acid | 1 | Water | Phenol | 3 | — | |
| Example 1-12 | Al | 99.99% | Sulfuric acid | 1 | Water | Glycerin | 40 | — | |
| Example 1-13 | Al | 99.99% | Lithium sulfate | 1 | Water | Glycollic acid | 5 | — | |
| Example 1-14 | Al | 99.99% | Potassium nitrate | 1 | Water | Formic acid | 0.5 | — | |
| Example 1-15 | Al | 99.99% | Potassium nitrate | 3 | Water | Acetic acid | 1 | — | |
| Example 1-15 | | | Lithium nitrate | 1 | Water | Propionic anhydride | 1 | — | |
| Example 1-16 | Al | 99.99% | Sodium sulfate | 4 | Water | Oxalic acid | 1 | — | |
| Example 1-17 | Al | 99.99% | Sodium nitrate | 2 | Water | Sulfosalicylic acid | 2 | — | |
| Example 1-18 | Al | 99.99% | Ammonium nitrate | 1 | Water | Malic acid | 3 | — | |
| Example 1-19 | Al | 99.99% | Potassium nitrate | 1 | Water | Tartaric acid | 2.2 | — | |
| Example 1-20 | Al | 99.99% | Lithium sulfate | 8 | Water | Sodium succinate | 30 | — | |

| | | | Cell Test | |
|---|---|---|---|---|
| | Ingredient (g/cm$^2$) | Corrosion test | Electromotive Force (V) | Capacity (mAh) |
| Example 1-1 | 1.00E+00 | 100 | 1.87 | 190 |
| Example 1-2 | 6.50E−01 | 103 | 1.78 | 200 |
| Example 1-3 | 1.00E−03 | 98 | 1.77 | 180 |
| Example 1-4 | 1.00E−09 | 96 | 1.88 | 190 |
| Example 1-5 | 6.00E−03 | 20 | 1.79 | 150 |
| Example 1-6 | 5.00E−17 | 102 | 1.8 | 210 |
| Example 1-7 | 2.00E−02 | 110 | 1.81 | 160 |
| Example 1-8 | 4.00E−01 | 98 | 1.84 | 180 |
| Example 1-9 | 2.00E−06 | 112 | 1.85 | 220 |
| Example 1-10 | 4.00E−04 | 104 | 1.89 | 190 |
| Example 1-11 | 1.00E−04 | 110 | 1.75 | 170 |
| Example 1-12 | 5.00E−03 | 101 | 1.77 | 185 |
| Example 1-13 | 1.00E−05 | 104 | 1.79 | 185 |
| Example 1-14 | 1.00E−06 | 113 | 1.88 | 190 |
| Example 1-15 | 2.00E−03 | 100 | 1.76 | 176 |
| Example 1-15 | 9.00E−02 | | | |
| Example 1-16 | 2.00E−02 | 98 | 1.85 | 200 |
| Example 1-17 | 1.00E−05 | 99 | 1.86 | 180 |
| Example 1-18 | 1.00E−03 | 94 | 1.86 | 180 |
| Example 1-19 | 3.00E−04 | 95 | 1.9 | 180 |
| Example 1-20 | 2.00E−02 | 98 | 1.87 | 180 |

TABLE 2

| | Negative electrode (wt %) | Electrolyte (M/L) | | Solvent | Additional Component (wt %) | | Others (wt %) |
|---|---|---|---|---|---|---|---|
| Example 1-21 | Al 99.99% | Nitric acid | 6 | Water | Fumaric acid | 5 | — |
| Example 1-22 | Al 99.99% | Nitric acid | 2 | Water | Phthalic acid | 1 | — |
| Example 1-23 | Al 99.99% | Sulfuric acid | 0.5 | Water | Malonic acid | 2.5 | — |
| Example 1-24 | Al 99.99% | Sulfuric acid | 2 | Water | Citric acid | 2.5 | — |
| Example 1-25 | Al 99.99% | Sulfuric acid | 3 | Water | Maleic acid | 2.5 | — |
| Example 1-26 | Al 99.99% | Sulfuric acid | 4 | Water | Lactic acid | 2.5 | — |
| Example 1-27 | Al 99.99% | Sulfuric acid | 2 | Water | Butyric acid | 2.5 | — |
| Example 1-28 | Al 99.99% | Sulfuric acid | 2.5 | Water | Pyruvic acid | 1.2 | — |
| Example 1-29 | Al 99.99% | Sulfuric acid | 3 | Water | Benzoic acid | 2.5 | — |
| Example 1-30 | Al 99.99% | Sulfuric acid | 5 | Water | Nitromethane | 2 | — |
| Example 1-31 | Al 99.99% | Aluminum nitrate | 0.5 | Methylethylcarbonate | Sulfoaniline | 1 | — |
| Example 1-32 | Al 99.99% | Aluminum nitrate | 0.5 | Methylethylcarbonate | Nitrobenzene Sulfonyl | 1 | — |
| Example 1-33 | Al 99.99% | Sulfuric acid | 1 | Water | Vinyl acetate | 2 | — |
| Example 1-34 | Al 99.99% | Sulfuric acid | 2 | Water | Vinyl sulfonate | 0.0001 | — |
| Example 1-35 | Al 99.99% | Nitric acid | 1 | Water | Poly (p-styrene sulfonate) | 2 | — |
| Example 1-36 | Al 99.99% | Sulfuric acid | 1.5 | Water | Ethyl acetate | 2 | — |
| Example 1-37 | Al 99.99% | Sulfuric acid | 0.2 | Water | Maleic anhydride | 2 | — |
| Example 1-38 | Al 99.99% | Nitric acid | 10 | Water | Diethyl malonate | 2 | — |
| Example 1-39 | Al 99.99% | Sulfuric acid | 9 | Water | Sodium benzoid | 2 | — |
| Example 1-40 | Al 99.99% | Sulfuric acid | 5 | Water | Sulfobenzoic acid | 0.01 | — |

| | Ingredient (g/cm$^2$) | Corrosion Test | Cell Test Electromotive Force (V) | Capacity (mAh) |
|---|---|---|---|---|
| Example 1-21 | 3.00E−02 | 100 | 1.87 | 180 |
| Example 1-22 | 9.00E−03 | 98 | 1.86 | 170 |
| Example 1-23 | 3.00E−03 | 99 | 1.85 | 160 |
| Example 1-24 | 2.00E−02 | 121 | 1.87 | 180 |
| Example 1-25 | 2.00E−02 | 112 | 1.79 | 170 |
| Example 1-26 | 8.00E−02 | 110 | 1.8 | 190 |
| Example 1-27 | 1.00E−05 | 113 | 1.9 | 190 |
| Example 1-28 | 1.00E−04 | 108 | 1.88 | 170 |
| Example 1-29 | 1.00E−02 | 109 | 1.87 | 180 |
| Example 1-30 | 9.00E−02 | 101 | 1.87 | 180 |
| Example 1-31 | 1.00E−02 | 20 | 1.81 | 135 |
| Example 1-32 | 8.00E−03 | 15 | 1.78 | 130 |
| Example 1-33 | 4.00E−04 | 23 | 1.75 | 140 |
| Example 1-34 | 1.00E−23 | 89 | 1.86 | 180 |
| Example 1-35 | 9.00E−01 | 96 | 1.83 | 170 |
| Example 1-36 | 1.00E−05 | 100 | 1.84 | 190 |
| Example 1-37 | 4.00E−04 | 102 | 2.00 | 200 |
| Example 1-38 | 7.00E−02 | 100 | 1.89 | 190 |
| Example 1-39 | 7.00E−03 | 99 | 1.78 | 190 |
| Example 1-40 | 6.50E−02 | 98 | 1.88 | 180 |

TABLE 3

| | Negative electrode (wt %) | Electrolyte (M/L) | | Solvent | Additional Component (wt %) | | Others (wt %) | |
|---|---|---|---|---|---|---|---|---|
| Example 1-41 | Al 99.99% | Nitric acid | 7.5 | Water | Ethylchloroacetate | 0.01 | Potassium iodide | 0.5 |
| Example 1-42 | Al 99.99% | Lithium sulfate | 10 | Methylethylcarbonate | Potassium vinylacetate | 7 | — | |
| Example 1-43 | Al 99.99% | Sulfuric acid | 1.5 | Water | Poly (Lithium p-styrenesulfonate) | 5 | Potassium chloride | 0.25 |
| Example 1-44 | Al 99.99% | Nitric acid | 0.5 | Water | Polyacrylic acid | 1 | Sodium fluoride | 1 |
| Example 1-45 | Al 99.99% | Sulfuric acid | 2.5 | Water | Lithium polyacrylate | 0.01 | Potassium bromide | 6 |
| Comparative example 1-1 | Al 99.99% | Sulfuric acid | 2 | Water | — | | — | |
| Comparative example 1-2 | Al 99.99% | Sulfuric acid | 0.5 | Water | — | | — | |
| Comparative example 1-3 | Al 99.99% | Aluminum nitrate | 2.5 | Water | — | | — | |

TABLE 3-continued

|  | Ingredient (g/cm2) | Corrosion Test | Cell Test Electromotive Force (V) | Capacity (mAh) |
|---|---|---|---|---|
| Example 1-41 | 8.00E−07 | 102 | 1.95 | 200 |
| Example 1-42 | 7.00E−04 | 109 | 1.86 | 190 |
| Example 1-43 | 4.00E−03 | 98 | 1.68 | 190 |
| Example 1-44 | 1.00E−06 | 98 | 1.76 | 200 |
| Example 1-45 | 8.00E−01 | 109 | 1.87 | 140 |
| Comparative example 1-1 |  | 14500 | 1.65 | 50 |
| Comparative example 1-2 |  | 8900 | 1.65 | 45 |
| Comparative example 1-3 |  | 28900 | 1.5 | 30 |

Comparative Example (1-4)

A zinc manganese cell comprised of a positive electrode made of manganese dioxide, a negative electrode made of zinc, and 1 M/L of zinc chloride solution provided as an electrolyte, was prepared and was then subjected to the corrosion test and the electric cell test by the same procedures just as with the case of Example 1.

In the corrosion test, as a result, hydrogen gas was generated 1.5 times more than that of Example (1-1). In the electric cell test, furthermore, an electromotive force of 1.6 V and a capacity of 80 mAh were obtained.

As shown in Tables 1 to 3, each of Examples (1-1) to (1-45) having the respective electrolytes with organic acids allows the improvements in the voltage and the capacity of the electric cell while inhibits the generation of gas accompanied with the corrosion.

On the other hand, in Comparative Examples (1-1) to (1-3) using the electrolyte containing nitrate ions or sulfate ions but organic acid, the excessive generation of gas depending on the corrosion was observed and the decreases in the voltage and the capacity were also observed. Similarly, the decreases in the voltage and the capacity were observed in the manganese cell.

Example (2-1)

In this example, as shown in FIG. 1, a coin-shaped electric cell using aluminum in a negative electrode was fabricated as follows.

First, as an electrolyte, an aqueous solution containing 1 M/L of sulfuric acid, 0.1 M/L of aluminum chloride, and 2% by weight of maleic acid were prepared.

Making of Negative Electrode

A closed-cylindrical aluminum container (1 mm in thickness and 99.9% in purity of aluminum, also served as a negative electrode) was dipped into 8 M/L of nitric acid for five days to form an oxide layer on the surface of the container.

Then, the oxide layer was subjected to a composition analysis using an inductively coupled plasma (ICP) atomic emission spectrometer and a gas analyzer (available from LECO, U.S.A). As a result, the composition ratio of the oxide layer was represented by the formula: $Al_2O_{3.01}X_{0.1}$.

Corrosion Test

The obtained negative electrode was dipped into the electrolyte described above for three days. Gas generated during the immersion was gathered and the yield of gas was measured to estimate the corrosion of aluminum. The results are shown in Table 1.

Electric Cell Test

At the beginning, a positive electrode mixture was prepared by blending a predetermined amount of manganese dioxide ($MnO_2$) as a positive electrode active material with 7.5% by weight of acetylene black and 5.0% by weight of polytetrafluoroethylene and subjecting the obtained blend to the press molding.

A glass fiber sheet of 30 m in thickness provided as a separator was held in an aluminum container, which was obtained as described above. Then, the positive electrode mixture obtained by the above step was placed on the separator. Furthermore, a positive electrode current collector was arranged on the positive mixture. Subsequently, the same electrolyte as one used in the corrosion test was injected into the container. After the injection, a closed-cylindrical-shaped sealing plate made of a metal was fixed on the container by swaging them together through an insulating gasket, resulting in a coin-shaped electric cell of 20 mm in diameter and 1.6 mm in thickness.

The electromotive force of the resulting cell and the cell capacities at the day of completing the fabrication and at a time completing the discharge until the voltage fells to 0.65 V at a current of 1 mA after the preservation for 100 days were measured. The results are listed in Table 4.

Examples (2-2) to (2 to 15), Comparative Example (2-1)

Each of the cells of Examples (2-2) to (2 to 15) and Comparative Example (2-1) was fabricated by the same way as that of Example 1 except that the materials for preparing the positive electrode, the negative electrode, and the electrolyte were those of Table 4 and Table 5, respectively. The electromotive force of the cell and the cell capacity were measured by the same ways as those of Example 1. The results are listed in Table 6.

In the corrosion test, by the way, the yield of gas wad defined as 100 in the example (2-1), so that the results were represented by the relative proportion to the example (2-1).

TABLE 4

| | Negative electrode | | | | Electrolyte | | | | |
|---|---|---|---|---|---|---|---|---|---|
| | Metal Component | Film Component | | | | | | | |
| | Metal:Purity (%) | Al ratio | O ratio | Element ratio | Electrolyte: M/L | | Solvent | Additional Component | |
| Example 2-1 | Al:99.99 | 2.00 | 3.010 | N:$10^{-1}$ | Nitric acid: | 1.0 | Water | Aluminum chloride: Maleic acid: | 0.10 M/L 2.0% |
| Example 2-2 | Al:99.99 | 2.00 | 3.002 | S:$10^{-11}$ | Sulfuric acid: | 16.0 | Water | Aluminum chloride: | 0.01 M/L |
| Example 2-3 | Al:94.5 Mg:2 Cr:3.5 | 2.00 | 3.000 | Cr:$5.8 \times 10^{-5}$ | Aluminum sulfate: | 0.20 | Water | | |
| Example 2-4 | Al:95.09 Mg:4.6 Zn:0.15 | 2.00 | 3.090 | B:$2.0 \times 10^{-2}$ | Ammonium sulfate: | 5.0 | Water | Propyl alcohol: Pyridine: | 0.10 M/L 3.0% |
| Example 2-5 | Al:99.99 | 2.00 | 3.010 | C:$2.0 \times 10^{-2}$ | Aluminum nitrate: | 1.0 | Water | Lithium chloride: | 6.00 M/L |
| Example 2-6 | Al:99.99 | 2.00 | 3.020 | P:$4.0 \times 10^{-4}$ | Sodium sulfate: | 3.0 | Water | Pyridine: | 3.0 M/L |
| Example 2-7 | Al:99.99 | 2.00 | 3.100 | N:$10^{-3}$ | Lithium nitrate: | 8.0 | Water | Diethyl malonate: | 4.00 M/L |
| Example 2-8 | Al:99.99 | 2.00 | 3.000 | S:$10^{-2}$ | Ammonium nitrate: | 9.0 | Water | Polyacryilic acid: Phenanthroline: | 0.10 M/L 0.10% |

TABLE 5

| | Negative electrode | | | | Electrolyte | | | | |
|---|---|---|---|---|---|---|---|---|---|
| | Metal Component | Film Component | | | | | | | |
| | Metal:Purity (%) | Al ratio | O ratio | Element:ratio | Electrolyte: M/L | | Solvent | Additional Component | |
| Example 2-9 | Al:99.99 | 2.00 | 3.002 | Cr:$3.0 \times 10^{-2}$ | Lithium nitrate: | 4.0 | Water | Polyacryilic acid ester: Dipyridyl: | 2.00 M/L 0.10% |
| Example 2-10 | Al:99.99 | 2.00 | 3.004 | B:$2.0 \times 10^{-2}$ | Sodium nitrate: | 0.5 | Water | Piperidine: | 0.04 M/L |
| Example 2-11 | Al:99.99 | 2.00 | 3.004 | C:$3.0 \times 10^{-3}$ | Sulfuric acid: | 7.0 | Water | Aluminum chloride: | 0.01 M/L |
| Example 2-12 | Al:99.99 | 2.00 | 3.002 | P:$4.0 \times 10^{-2}$ | Aluminum nitrate: | 7.0 | Water | Ammonium chloride: | 0.01 M/L |
| Example 2-13 | Al:99.99 | 2.00 | 3.005 | N:$2 \times 10^{-2}$ | Sodium sulfate: | 4.0 | Water | Lithium chloride: Dipyridyl: | 0.01 M/L 1.0% |
| Example 2-14 | Al:99.99 | 2.00 | 3.002 | S:$9.0 \times 10^{-2}$ | Lithium nitrate: | 7.0 | Water | Aluminum chloride: | 2.0 M/L |
| Example 2-15 | Al:99.5 | 2.00 | 3.002 | Cr:$10^{-1}$ | Ammonium nitrate: | 7.0 | MEC | Aluminum chloride: | 0.01 M/L |
| Comparative example 2-1 | Al:99.5 | 2.00 | 3.006 | none | Sulfuric acid: | 3.0 | Water | Lithium chloride: | 1.00 M/L |

TABLE 6

| | Corrosion Test | Discharge Test (immediately after made) | | Discharge Test (1 year after made) | |
|---|---|---|---|---|---|
| | | Voltage (V) | Discharge Capacity (mAh) | Voltage (V) | Discharge Capacity (mAh) |
| Example 2-1 | 100 | 2.10 | 230 | 2.00 | 250 |
| Example 2-2 | 90 | 1.95 | 210 | 1.93 | 200 |
| Example 2-3 | 80 | 1.75 | 180 | 1.70 | 160 |
| Example 2-4 | 80 | 1.95 | 190 | 1.93 | 180 |
| Example 2-5 | 70 | 1.95 | 210 | 1.92 | 180 |
| Example 2-6 | 60 | 1.80 | 210 | 1.78 | 190 |
| Example 2-7 | 90 | 1.87 | 190 | 1.86 | 185 |
| Example 2-8 | 80 | 1.90 | 210 | 1.87 | 190 |
| Example 2-9 | 70 | 1.75 | 200 | 1.74 | 195 |
| Example 2-10 | 50 | 1.83 | 190 | 1.81 | 180 |
| Example 2-11 | 80 | 1.86 | 195 | 1.83 | 190 |
| Example 2-12 | 70 | 1.75 | 165 | 1.72 | 160 |
| Example 2-13 | 60 | 1.82 | 190 | 1.80 | 170 |
| Example 2-14 | 70 | 1.84 | 170 | 1.82 | 165 |
| Example 2-15 | 80 | 1.75 | 150 | 1.73 | 148 |
| Comparative example 2-1 | $2 \times 10^{-6}$ | 1.90 | 200 | 0.80 | 10 |

Example (3-1)

A cylindrical-shaped electric cell as shown in FIG. 2 using aluminum in a negative electrode was prepared as follows.

<Making of Positive Electrode>

A positive electrode mixture was prepared by blending a predetermined amount of manganese dioxide ($MnO_2$) as a positive electrode active material with 10% by weight of acetylene black and 3% by weight of polytetrafluorethylene as a binder and subjecting the obtained blend to the press-molding to make it into a cylindrical shape. In addition, a carbon film made of carbon fibers in 100 μm in thickness was used as a positive current collector.

<Making of Negative Electrode>

A negative electrode gel was prepared by blending 95% by weight of an aluminum power (99.99% in purity) with 4% by weight of acrylate polymer as a thickening agent, followed by adding an electrolyte. Also, a stainless metal rod was prepared as a negative electrode current collector.

<Making of Electric Cell>

A cylindrical-shaped aluminum electric cell of 14 mm in diameter and 50 mm in total height having the structure shown in FIG. 2 was fabricated as follows. The positive electrode mixture and a separator made of glass fiber (30 μm in thickness) were arranged in the closed-cylindrical positive current collector. Then, the separator was filled with the negative electrode gel, followed by injecting the same electrolyte as that of explained in Example 1 into the positive electrode mixture, the separator, and the negative electrode gel. Subsequently, the negative electrode current collector was inserted into the negative gel. After that, a negative electrode terminal plate, a positive electrode terminal, and an external-casing material made of polypropylene were used to seal the openings.

The electromotive force and the cell capacity of the resulting cell were measured. That is, the cell capacity at the time of completing the discharge until the voltage fells to 0.65 V at a current of 100 mA was measured. An electromotive force of 1.85 V and a capacity of 2800 mAh were observed. Thus, a high voltage and a high capacity were attained.

Examples (3-2) to (3 to 21), Comparative Examples (3-1) to (3-3)

The composition of the electrolyte was prepared using materials listed in Table 7 and Table 8. Then, 0.5 grams of aluminum powder or aluminum alloy powder (106 to 500 μm in diameter) was poured in the electrolyte, followed by subjecting to the same corrosion test as that of Example 1.

In addition, a cylindrical electric cell was fabricated by the same way as that of Example (3-1) using the negative electrode material and the electrolyte listed in Table 8. The resulting cell was subjected to the measurements of electromotive force and cell capacity thereof. The results were listed in Table 8.

Concurrently, a cylindrical electric cell of each comparative example was prepared by the same way as that of Example (3-1), except of using the electrolyte shown in one of Comparative Examples (3-1) to (3-3). The results are listed in Table 8.

TABLE 7

| | Negative electrode (wt %) | | Electrolyte (M/L) | Solvent | Electrolyte Additional Component (M/L) | | Other (wt %) | | Corrosion Test μl/g · day | Cell Test Electromotive Force (V) | Capacity (mAh) |
|---|---|---|---|---|---|---|---|---|---|---|---|
| Example 3-1 | Al | 99.99% | Nitric acid | 3 | Water | 1.10-phenanthroline-hydrate | 3.0 | — | — | 216 | 1.87 | 2880 |
| Example 3-2 | Al Mg Cr | 95.00% 4.50% 0.50% | Nitric acid | 1 | Water | Vasophenanthroline | 1.0 | Aluminum chloride | 0.25 | 86 | 1.86 | 2470 |
| Example 3-3 | Al | 99.99% | Sulfuric acid | 1 | Water | 1.10-phenanthroline-hydrate | 3.0 | Maleic acid | 3.0 | 149 | 1.85 | 2880 |
| Example 3-4 | Al Mg | 99.50% 4.50% | Sulfuric acid | 1 | Water | 2.4.6-tri-2-pyridyl-1.3.5-triazine | 1.0 | Aluminum chloride | 0.25 | 211 | 1.86 | 2670 |
| Example 3-5 | Al | 99.99% | Sulfuric acid | 2 | Water | 2.2-dimethylmethoxy benzidine | 2.5 | Aluminum chloride | 0.25 | 121 | 1.87 | 2380 |
| Example 3-6 | Al | 99.99% | Sulfuric acid | 3 | Water | Quinoline | 1.0 | Lithium nitrate | 0.01 | 112 | 1.79 | 3170 |
| Example 3-7 | Al | 99.99% | Sulfuric acid | 1 | Water | 1.10-phenanthroline-hydrate | 2.5 | Aluminum chloride | 0.25 | 78 | 1.8 | 2190 |
| Example 3-8 | Al | 99.99% | Sulfuric acid | 1 | Water | Quinaldine | 2.5 | Lithium nitrate | 0.01 | 113 | 1.9 | 2890 |
| Example 3-9 | Al | 99.99% | Sulfuric acid | 2.5 | Water | 2.2-dipyridyl | 1.2 | — | — | 108 | 1.88 | 2870 |
| Example 3-10 | Al | 99.99% | Sulfuric acid | 1 | Water | Phenazine | 2.5 | — | — | 89 | 1.87 | 2780 |
| Example 3-11 | Al | 99.99% | Sulfuric acid | 1 | Water | Quinoline | 0.5 | Tartaric acid | 2.0 | 101 | 1.87 | 2780 |

TABLE 8

| | Negative electrode (wt %) | | Electrolyte (M/L) | Solvent | Electrolyte Additional Component (M/L) | | Others (wt %) | | Corrosion Test μl/g · day | Cell Test Electromotive Force (V) | Capacity (mAh) |
|---|---|---|---|---|---|---|---|---|---|---|---|
| Example 3-12 | Al | 99.99% | Aluminum nitrate | 0.5 | Methylethyl-carbonate | Acridine | 0.0005 | Malic acid | 2.0 | 120 | 1.81 | 2635 |
| Example 3-13 | Al | 99.99% | Aluminum nitrate | 0.5 | Methylethyl-carbonate | Imidazole | 0.2 | Maleic acid | — | 125 | 1.78 | 2430 |
| Example 3-14 | Al | 99.99% | Sulfuric acid | 1 | Water | Diethyl amine | 2 | Aluminum chloride | 0.25 | 154 | 1.75 | 2240 |
| Example 3-15 | Al | 99.99% | Sulfuric acid | 2 | Water | Acridine | 0.0005 | Maleic acid | 2.0 | 89 | 1.86 | 3280 |
| Example 3-16 | Al | 99.99% | Nitric acid | 1 | Water | 1.10-phenanthroline-hydrate | 2 | Nitric acid | 0.01 | 96 | 1.83 | 2770 |
| Example 3-17 | Al | 99.99% | Sulfuric acid | 1.5 | Water | Benzotriazole | 2 | — | — | 100 | 1.84 | 2890 |
| Example 3-18 | Al | 99.99% | Sulfuric acid | 0.2 | Water | Succinic imide | 2 | Aluminum chloride | 0.50 | 82 | 2.00 | 2200 |
| Example 3-19 | Al | 99.99% | Nitric acid | 10 | Water | Succinic imide | 2 | | | 67 | 1.89 | 2190 |

TABLE 8-continued

| | Negative electrode (wt %) | | Electrolyte (M/L) | | Solvent | Additional Component (M/L) | | Others (wt %) | | Corrosion Test μl/g · day | Cell Test Electromotive Force (V) | Capacity (mAh) |
|---|---|---|---|---|---|---|---|---|---|---|---|---|
| Example 3-20 | Al | 99.99% | Sulfuric acid | 1 | Water | Maleic imide | 2 | Lithium nitrate | 0.02 | 159 | 1.78 | 3190 |
| Example 3-21 | Al | 99.99% | Sulfuric acid | 5 | Water | Azobenzene | 2 | — | | 298 | 1.88 | 2180 |
| Comparative example 3-1 | Al | 99.99% | Sulfuric acid | 2.0 | Water | — | | — | | 102800 | 1.65 | 540 |
| Comparative example 3-2 | Al | 99.99% | Sulfuric acid | 0.5 | Water | — | | — | | 86800 | 1.65 | 450 |
| Comparative example 3-3 | Al | 99.99% | Aluminum nitrate | 2.5 | Water | — | | — | | 159000 | 1.50 | 630 |

Comparative Example (3-4)

A zinc manganese cell comprised of a positive electrode made of manganese dioxide, a negative electrode made of zinc, and 1 M/L of zinc chloride solution provided as an electrolyte, was prepared and was then subjected to the corrosion test and the electric cell test by the same procedures just as with the case of Example (3-1).

In the corrosion test, as a result, hydrogen gas was generated 1.2 times more than that of Example 1. In the electric cell test, furthermore, an electromotive force of 1.6 V and a capacity of 80 mAh were obtained.

As a result, it is clear that the electric cell of the present invention using aluminum in a negative electrode is hardly susceptible to corrosion and is able to produce high-power.

In summary, as described above, the electric cell of the present invention uses aluminum in a negative electrode, so that the voltage and the capacity of the cell can be improved as the generation of gas depending on the self-discharge is prevented.

The present invention has been described in detail with respect to preferred embodiments, and it will now be obvious to those skilled in the art that changes and modifications may be made without departing from the invention in its broader aspects.

What is claimed is:

1. An electric cell comprising a positive electrode, a negative electrode containing aluminum or aluminum alloy, and an electrolyte arranged between the positive electrode and the negative electrode, wherein
the electrolyte includes:
at least one ion selected from the group consisting of a sulfate ion ($SO_4^{2-}$) and a nitrate ion ($NO_3^-$), the concentration of the at least one ion being in the range of 0.2 to 16 M/L; and
an additive selected from the group consisting of an organic acid, a salt of the organic acid, a hydrate of the organic acid, an ester of the organic acid, an ion of the organic acid, and derivatives thereof.

2. The electric cell as claimed in claim 1, the concentration of the at least one ion being in the range of 0.5 to 10 M/L.

3. The electric cell as claimed in claim 1, the electrolyte further comprising a solvent for dissolving the electrolyte.

4. The electric cell as claimed in claim 1, the electrolyte further comprising a halogen ion.

5. The electric cell as claimed in claim 4, a concentration of the halogen ion being 0.01 to 6 M/L.

6. The electric cell as claimed in claim 4, a concentration of the halogen ion being 0.05 to 4 M/L.

* * * * *